(12) United States Patent
Menconi et al.

(10) Patent No.: US 11,661,806 B2
(45) Date of Patent: *May 30, 2023

(54) DOWNHOLE VALVE SPANNING A TOOL JOINT AND METHODS OF MAKING AND USING SAME

(71) Applicant: Bench Tree Group, LLC, Georgetown, TX (US)

(72) Inventors: John R. Menconi, Portland, OR (US); Pedro R. Segura, Jr., Round Rock, TX (US)

(73) Assignee: Bench Tree Group, LLC, Georgetown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,535

(22) Filed: Jun. 20, 2022

(65) Prior Publication Data

US 2023/0038419 A1 Feb. 9, 2023

Related U.S. Application Data

(63) Continuation of application No. 16/901,851, filed on Jun. 15, 2020, now Pat. No. 11,365,596, which is a
(Continued)

(51) Int. Cl.
*E21B 47/24* (2012.01)
*E21B 21/10* (2006.01)
(Continued)

(52) U.S. Cl.
CPC .............. *E21B 21/10* (2013.01); *E21B 17/02* (2013.01); *E21B 17/07* (2013.01); *E21B 47/18* (2013.01);
(Continued)

(58) Field of Classification Search
CPC ........ E21B 47/187; E21B 17/04; E21B 47/18; E21B 47/12; E21B 47/24; E21B 47/22; E21B 47/20

See application file for complete search history.

(56) References Cited

U.S. PATENT DOCUMENTS

| | | | |
|---|---|---|---|
| 3,957,114 | A | 5/1976 | Streich |
| 3,958,217 | A | 5/1976 | Spinnler |

(Continued)

FOREIGN PATENT DOCUMENTS

| | | |
|---|---|---|
| CN | 201212375 | 3/2009 |
| CN | 2782923 | 5/2009 |

(Continued)

OTHER PUBLICATIONS

China Patent Application No. 201710418823.X—First Office Action with an English translation, 12 pages.

*Primary Examiner* — Kipp C Wallace
(74) *Attorney, Agent, or Firm* — Dunlap Codding, P.C.

(57) ABSTRACT

A downhole valve is described. The downhole valve has a pilot valve section and a tool section. The pilot valve section has a first tube. The tool section has a second tube slidably coupled to the first tube of the pilot valve section so as to provide fluid communication between the pilot valve section and the tool section. The tool section can be in the form of a signal valve section of a mud pulse telemetry valve, a reamer, a vertical steerable tool, a rotary steerable tool, a by-pass valve, a packer, a whipstock, or stabilizer.

6 Claims, 2 Drawing Sheets

Related U.S. Application Data continuation of application No. 15/863,259, filed on Jan. 5, 2018, now Pat. No. 10,683,717, which is a continuation of application No. 15/174,463, filed on Jun. 6, 2016, now Pat. No. 9,863,197.

(51) Int. Cl.

| | | |
|---|---|---|
| *E21B 47/18* | (2012.01) | |
| *E21B 17/02* | (2006.01) | |
| *E21B 47/22* | (2012.01) | |
| *E21B 17/07* | (2006.01) | |
| *F16K 31/12* | (2006.01) | |
| *E21B 43/08* | (2006.01) | |
| *E21B 33/12* | (2006.01) | |

(52) U.S. Cl.
CPC .............. *E21B 47/22* (2020.05); *E21B 47/24* (2020.05); *F16K 31/12* (2013.01); *E21B 33/12* (2013.01); *E21B 43/08* (2013.01)

(56) References Cited

U.S. PATENT DOCUMENTS

| | | | | |
|---|---|---|---|---|
| 3,973,587 | A * | 8/1976 | Cochran | E21B 34/08 |
| | | | | 137/496 |
| 4,374,547 | A * | 2/1983 | Nguyen | E21B 7/067 |
| | | | | 175/45 |
| 4,901,290 | A * | 2/1990 | Feld | E21B 47/18 |
| | | | | 367/85 |
| 5,065,825 | A * | 11/1991 | Bardin | E21B 7/06 |
| | | | | 175/48 |
| 5,333,686 | A | 8/1994 | Vaughan | |
| 5,392,867 | A | 2/1995 | du Chaffaut et al. | |
| 5,586,084 | A | 12/1996 | Barron | |
| 6,016,288 | A | 1/2000 | Frith | |
| 6,253,842 | B1 * | 7/2001 | Connell | E21B 34/066 |
| | | | | 166/66.5 |
| 6,571,876 | B2 | 6/2003 | Szarka | |
| 7,178,599 | B2 | 2/2007 | Anderson et al. | |
| 7,237,626 | B2 | 7/2007 | Gurjar | |
| 9,638,025 | B2 * | 5/2017 | Pare | F16K 37/0025 |
| 10,907,447 | B2 * | 2/2021 | Stang | E21B 4/02 |
| 2002/0174988 | A1 | 11/2002 | Szarka | |
| 2004/0154803 | A1 | 8/2004 | Anderson et al. | |
| 2005/0205304 | A1 | 9/2005 | Gurjar | |
| 2006/0193697 | A1 | 8/2006 | Wentworth et al. | |
| 2009/0195250 | A1 | 8/2009 | Welshans | |
| 2014/0332277 | A1 | 11/2014 | Churchill | |
| 2015/0292273 | A1 | 10/2015 | Lim | |
| 2017/0016289 | A1 * | 1/2017 | Gillis | E21B 4/10 |

FOREIGN PATENT DOCUMENTS

| | | |
|---|---|---|
| CN | 103946482 | 7/2014 |
| CN | 104169520 | 11/2014 |
| CN | 105626940 | 6/2016 |
| WO | 2007/146801 | 12/2007 |
| WO | WO2011104516 | 9/2011 |

* cited by examiner

DOWNHOLE VALVE SPANNING A TOOL JOINT AND METHODS OF MAKING AND USING SAME

INCORPORATION BY REFERENCE

The present patent application claims priority to and incorporates by reference the entirety of the United States patent application identified by U.S. Ser. No. 16/901,851, filed on Jun. 15, 2020, which is a continuation of U.S. Ser. No. 15/863,259, filed on Jan. 5, 2018, which is a continuation of U.S. Ser. No. 15/174,463, filed on Jun. 6, 2016, now U.S. Pat. No. 9,863,197, and titled "Downhole Valve Spanning a Tool Joint and Methods of Making and Using Same."

BACKGROUND

Integrating a mud pulse telemetry valve into a measuring while drilling (MWD)/logging while drilling (LWD) System is sometimes cumbersome and expensive due the tight mechanical spacing tolerance requirements of the system components. Mechanical, electrical, and hydraulic connections must be maintained.

Components of these systems are prone to mechanical wear because they include moving parts that are placed directly in the drill string's fluid flow path. The parts of this system are designed to generate pressure pulses so they purposely disrupt flow and are exposed to very high velocity abrasive media. Additionally, in some designs, interchangeable components that disrupt the drilling fluid flow are configured for very specific drilling fluid flow rates. Occasionally, these configurations require adjustment at the rigsite.

Additionally, drill stem members, i.e., drill pipe and drill collars, that house or are a part of the mud pulse telemetry valve can include threaded joints that can become damaged. The likelihood of thread damage is high because of the materials typically used in these devices and the large mass of these members which require heavy machinery to handle and torque the members together. The damaged members sometimes require replacement. Sometimes, damaged threads can be re-machined ("cut back") to restore their condition and extend the useful life of the very expensive drill stem member. This re-machining, however, changes the length of the member and can inadvertently change the mechanical spacing between the system components of the mud pulse telemetry valve requiring the replacement of the drill stem member.

Because of the tremendous investment already made in drill pipe and drill collars, it is highly desirable that the mud pulse telemetry valve be compatible with existing drilling equipment and require minimum or no modification to the drill pipe and drill collars. Mud pulse telemetry is known to offer an effective solution since it does not rely upon electrical wiring extending to the surface, or other mechanisms which may necessitate modification to existing hardware. Mud pulse telemetry propagates signals through the drilling fluid flowing in the drill string to the surface at the speed of sound, thereby providing a very fast communication link to the surface. Mud pulse telemetry is usually in the form of a valve located in the vicinity of the drilling bit, which intermittently restricts the flow of drilling fluid within the drill string. The mud pulse telemetry system may be lowered on a wireline located within the drill string, but is usually formed as an integral part of a special drill collar inserted into the drill string near the drilling bit.

A continuous column of drilling fluid is circulating within the drill string from the surface of the well to the drill bit at the bottom of the well during normal drilling operations. The basic operational concept of mud pulse telemetry is to intermittently restrict the flow of drilling fluid as it passes through the downhole telemetry valve, thereby creating a pressure pulse in the flow of the drilling fluid that travels to the surface of the well at the speed of sound through the drilling fluid. The information sensed in the vicinity of the drilling bit, which is to be transmitted to the surface, is encoded into a digital format and that digital formatted signal is used to intermittently actuate the downhole telemetry valve which restricts the flow of drilling fluid in the drill string, thereby transmitting pulses to the surface. The pulses are detected at the surface and transformed into electrical or other signals which can be decoded and processed to reveal transmitted information. In a typical oil or gas well, drilling fluid is circulated through the interior of the drill pipe at flow rates of about 100 to about 1200 gallons per minute. The mud pulse telemetry system must operate to partially restrict this flow. Therefore, the system must control large amounts of energy. The downhole telemetry valve must operate quickly to create a pressure pulse in this high pressure environment to intermittently restrict the flow of drilling fluid. This restriction must be sufficient to create a pressure rise in the flow stream that will be detectable at the surface of the well. At the typically high flow rates of drilling fluid, considerable force and energy are required to actuate the downhole telemetry valve in the manner necessary to create the desired pressure pulses.

Accordingly, there exists a need for a downhole valve capable of effectively transmitting downhole data or operating a downhole tool while reducing repair and maintenance costs. The inventive concepts disclosed herein are directed to such a downhole valve that, in some embodiments, can be characterized and/or used as a mud pulse telemetry valve.

DETAILED DESCRIPTION OF EXEMPLARY EMBODIMENTS

Figure 1:
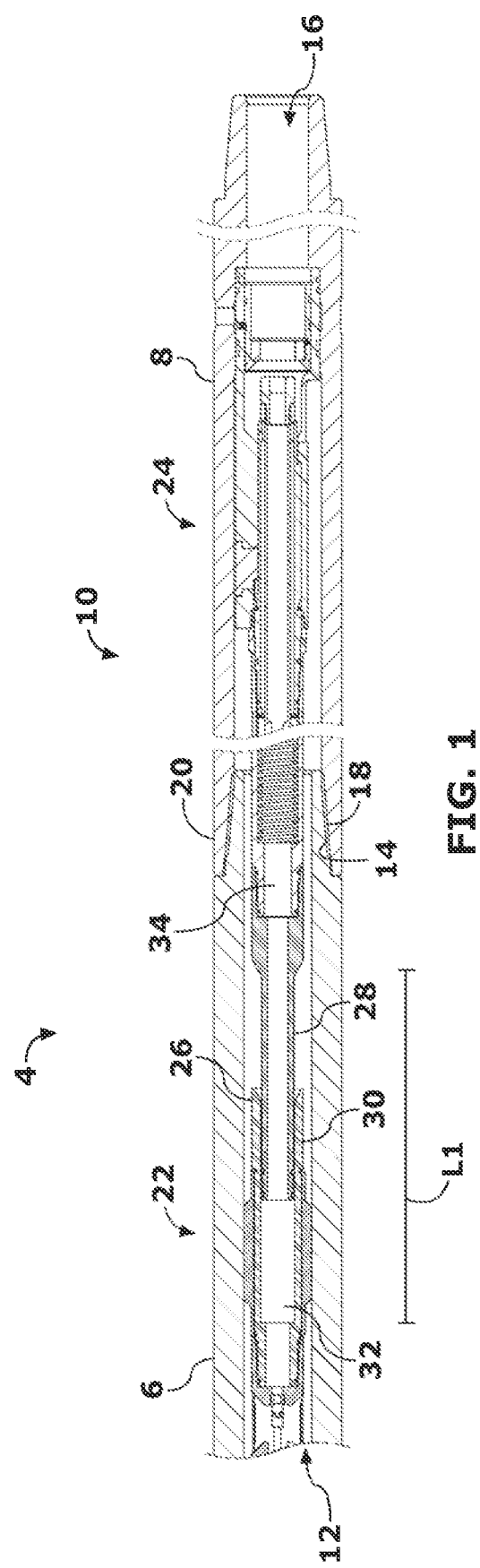
FIG. 1 is a partial sectional view of an exemplary downhole valve deployed across a tool joint in accordance with the presently disclosed inventive concepts.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

As used herein, the term "drilling fluid" or "drill fluid" refers to circulating fluid used in rotational drilling to perform various functions during drilling operations.

Referring now to the figures, and in particular to FIG. 1, shown therein is an embodiment of an assembly 4 constructed in accordance with the present disclosure. The assembly 4 can be a part of a drill stem and/or bottom hole assembly and used as part of a drill string to drill a bore into a subterranean formation. In general, the assembly 4 is provided with a first tubular member 6, a second tubular member 8, and a downhole valve 10. The first tubular member 6 is provided with a first bore 12 and a first end 14. The second tubular member 8 is provided with a second bore 16 and a second end 18. The first end 14 of the first tubular member 6 is connected to the second end 18 of the second tubular member 8 to form a tool joint 20 such that the first bore 12 communicates with the second bore 16. In the embodiment shown in FIG. 1, the first tubular member 6 is threadably connected to the second tubular member 8 at the tool joint 20. In one embodiment, the first tubular member 6 and the second tubular member 8 may be drill collars, for example.

The downhole valve 10 is disposed within the first bore 12 and the second bore 16 so as to span the tool joint 20. In addition, the downhole valve 10 is secured to the first tubular member 6 and the second tubular member 8.

The downhole valve 10 is provided with a pilot valve section 22 and a tool section 24 connected by a slip joint 26.

In this embodiment, the tool section 24 includes a first tube 28, and the pilot valve section 22 includes a second tube 30. The first tube 28 of the tool section 24 extends beyond the confines of the second tubular member 8 and across the tool joint 20 and is slidably connected to the second tube 30, which is recessed within the first tubular member 6, of the pilot valve section 22 to form the slip joint 26. However, it should be understood that in some embodiments the first tube 28 can be recessed within the second tubular member 8 and the second tube 30 can extend beyond the confines of the first tubular member 6 and across the tool joint 20. Also, in some embodiments, the second tube 30 can be recessed within the first tube 28.

Slip joint 26 can be a fluid tight connection that allows rotational and longitudinal movement between the pilot valve section 22 and the tool section 24 while allowing pressurized drilling fluid in a first chamber 32 formed in pilot valve section 22 to pass through a second chamber 34 formed in the tool section 24. In some embodiments, the slip joint 26 may not be completely fluid tight and may have an acceptable amount of leakage.

Figure 2:
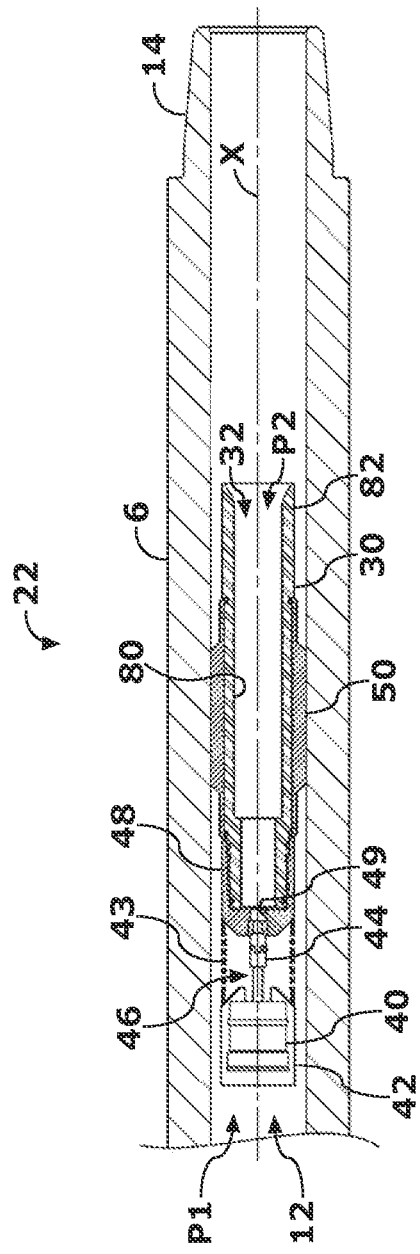
FIG. 2 is a partial sectional view of a pilot valve section of the downhole valve of FIG. 1 in accordance with one embodiment of the presently disclosed inventive concepts.
Figure 3:
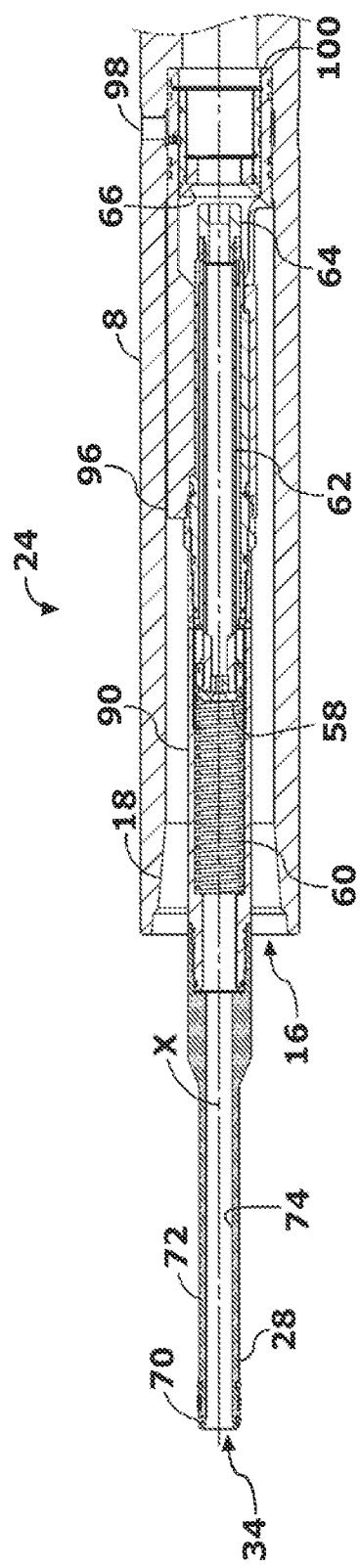
FIG. 3 is a partial sectional view of a signal valve section of the downhole valve of FIG. 1 in accordance with one embodiment of the presently disclosed inventive concepts.

Referring now to FIGS. 2 and 3, pilot valve section 22 is shown having an actuator 40, an actuator housing 42, a screen 43, a pilot valve member 44, a shaft 45, a pilot valve chamber 46, a pilot valve seat section 48, fluid passageway 49, support fins 50, and the second tube 30. Pilot valve section 22 may be secured in the first tubular member 6, for instance, via one or more set screw (not shown) threadably connecting one or more of the support fins 50 to the first tubular member 6. In some embodiments, the support fins 50 may be sized and dimensioned to center the pilot valve section 22 within the first tubular member 6. The actuator housing 42, screen 43, pilot valve seat section 48, and support fins 50 may be secured to one another by means known in the art such as, for instance, threadable connections. It should be noted that in some embodiments, the support fins 50 may be part of the first tubular member 6 and the actuator housing 42, screen 43, and pilot valve seat section 48 may be secured to the support fins 50 by means known in the art such as, for instance, at least one set screw (not shown). Further, other methodologies can be used to secure the pilot valve section 22 within the first tubular member 6.

Pilot valve member 44 is threadably secured to one end of shaft 45 which is connected to the actuator 40. When it is desired to move the pilot valve member 44, the actuator 40 is energized and exerts a pushing or pulling force sufficient to push or pull the pilot valve member 44 into a closed or open position.

Drilling fluid having a first pressure P1 passes through a plurality of small openings in the screen 43 and into pilot valve chamber 46. When the pilot valve member 44 is in the open position, at least a portion of the drilling fluid and/or pressure is communicated through fluid passageway 49 which has a small diameter formed in one end of the pilot valve seat section 48 and into the first chamber 32. After having passed through the fluid passageway 49, drilling fluid in the first chamber 32 has a second pressure P2. As shown in FIG. 2, the fluid passageway 49 may be substantially closed when the pilot valve member 44 at least partially interfaces with the pilot valve seat section 48. When pilot valve member 44 interfaces with pilot valve seat section 48, drilling fluid flow into first chamber 32 is reduced.

As best shown in FIG. 3, the tool section 24 is provided with the first tube 28, a spring 60, a piston 62, a flow plug 64, an orifice 66, a piston housing 90, a signal valve section seat 96, and at least one set screw 98. In the embodiment shown, the tool section 24 is a signal valve section of a mud pulse telemetry valve, however, it should be noted that the tool section 24 may be other types of drilling tools such as, for instance, a reamer, a vertical steerable tool, a rotary steerable tool, a by-pass valve, a packer, a whipstock, or stabilizer.

When pilot valve member 44 is in the closed position, the limited pressurized drilling fluid flowing into first chamber 32 does not exert sufficient pressure on an upper end 58 of the piston 62 to extend spring 60 and hold a flow plug 64 (sometimes referred to as a poppet) of piston 62 in engagement with orifice 66 which allows drilling fluid to flow around the flow plug 64 of the piston 62 and through orifice 66. In other words, the decrease in pressure causes a differential pressure across flow plug 64, i.e. low pressure on the uphole facing end of flow plug 64 and high pressure on the downhole facing surface of flow plug 64. This action provides flow plug 64 with the necessary pressure condition to begin retracting from orifice 66 until an equilibrium pressure measured across flow plug 64 is achieved. When pilot valve member 44 is in the open position, pressurized drilling fluid flows into the first chamber 32 and onto the upper end 58 of piston 62 adding the needed partial pressure bias to force spring 60 to extend and urge piston 62 downwardly, thereby moving flow plug 64 downward to at least partially engage with orifice 66.

Although specific examples of the downhole valve 10 are shown and described above, it should be understood that the tool section 24 and the pilot valve section 22 can be implemented in other manners so long as one or more slip joint 26 hydraulically connects the tool section 24 to the pilot valve section 22.

As shown in FIG. 3, the first tube 28 forms a generally tubular structure having a substantially circular cross section and is provided with at least one seal 70, an outer surface 72, and an inner surface 74.

As shown in FIG. 2, the second tube 30 forms a generally tubular structure having a substantially circular cross section and is provided having an inner surface 80 and an outer surface 82.

When first tubular member 6 and second tubular member 8 are connected at tool joint 20, the outer surface 72 of the first tube 28 is at least partially concentrically surrounded by the inner surface 80 of the second tube 30 to form the slip joint 26. To facilitate a fluid tight seal of the slip joint 26, the at least one seal 70 of the first tube 28 at least partially interfaces with the inner surface 80 of the second tube 30. It should be noted that in some embodiments, the slip joint 26 does not require a fluid tight seal and a the slip joint 26 may incorporate a seal-less joint so long as sufficient pressure is maintained within the slip joint 26 to operate the tool section 24.

As explained above, it is common in the drilling industry for drill pipe such as first tubular member 6 and second tubular member 8 to be damaged during the drilling process. One area of common damage is the tool joint 20. When the tool joint 20 is damaged, the tool joint 20 must be re-tooled, for instance, by machining to ensure a secure connection. Machining removes material from one or both of the first tubular member 6 or second tubular member 8 which changes the relative distance and/or relative orientation between the pilot valve section 22 and the tool section 24. Because of the circular shape of the first tube 28 and the second tube 30 that together form the slip joint 26, the pilot valve section 22 and the tool section 24 are not required to be oriented in any specific relation to one another. In other words, the downhole valve 10 only requires that the pilot valve section 22 and the tool section 24 be substantially aligned along axis X.

In addition, slip joint 26 allows the relative distance between the pilot valve section 22 and the tool section 24 to be adjusted longitudinally along axis X. For instance, damage to the first tubular member 6 and/or the second tubular member 8 at the tool joint 20 may require re-cutting of threads and/or shoulders which would shorten the first tubular member 6 and/or the second tubular member 8. The slip joint 26 allows such repairs to be made without requiring re-tooling to re-insert the downhole valve 10 because the change in length and relative orientation can be absorbed by the slip joint 26.

The slip joint 26 allows longitudinal adjustment between the pilot valve section 22 and the tool section 24 as long as sufficient differential pressure across the downhole valve 10 is maintained to actuate the tool section 24 despite pressure changes caused by changes in a length L1 (FIG. 1) of the slip joint 26. In the present example, the length L1 of the slip joint 26 must be maintained such that pressure P2 of the drilling fluid across the upper end 58 of the piston 62 is sufficient to extend spring 60 and hold the flow plug 64 of piston 62 in engagement with orifice 66 when the pilot valve member 44 is in the open position. A maximum length of the slip joint 26 is limited by pressure losses and the required tool actuation pressure. A minimum length of the slip joint 26 is dictated by the length of engagement of the tool joint 20 and desired tool joint cutbacks that would want to be absorbed or adjusted for.

In some embodiments of the downhole valve 10, the first tube 28 and the second tube 30 may be designed to permit misalignment. For example, at least a portion of the first tube 28 and the second tube 30 may be constructed of a flexible material (e.g., steel) having sufficient durability to withstand the downhole environment. In another embodiment, a mechanical joint (not shown) may be inserted in the first tube 28 and/or the second tube 30 that absorbs misalignment.

As best shown in FIG. 3, the first tube 28 may be removeably secured to the piston housing 90. In some embodiments, the piston housing 90 also serves to secure the spring 60 and act as a linear guide for the piston 62.

In the embodiment shown in FIG. 3, the piston housing 90 is removeably secured to the signal valve section seat 96. The signal valve section seat 96 is secured in second tubular member 8, for instance, using at least one set screw 98 or other securing means. In some embodiments, to facilitate a secure connection, the second tubular member 8 may be provided having a shoulder 100 on which the signal valve section seat 96 rests.

As will be understood by one skilled in the art, the presently disclosed assembly 4 can be assembled at one location such as, for instance, a wellsite. Alternately, the assembly 4 can be at least partially assembled at a first location, such as a service center or lab, and then completely assembled at a second location, such as a wellsite. For example, the pilot valve section 22 of the downhole valve 10 can be positioned and secured in the first bore 12 of the first tubular member 6 adjacent to the first end 14 of the first tubular member 6 at the first location. Similarly, the tool section 24 of the downhole valve 10 can be positioned and then secured in the second bore 16 of the second tubular member 8 adjacent to the second end 18 of the second tubular member 8. In this embodiment, the first tube 28 of the tool section 24 extends beyond the confines of the second tubular member 8.

Once the pilot valve section 22 has been secured to the first tubular member 6, and the tool section 24 has been secured to the second tubular member 8, the first and second tubular members 6 and 8 can be transported to the second location, such as the wellsite, and be used to form a portion of the drill stem.

For example, the first end 14 of the first tubular member 6 can be connected to the second end 18 of the second tubular member 8 to form the tool joint 20 thereby also fluidly connecting the pilot valve section 22 of the downhole valve 10 disposed within the first tubular member 6 to the tool section 24 of the downhole valve 10 disposed within the first tube 28.

The modular nature of the downhole valve 10 allows interchange of components, for instance, due to wear, damage, or alternate configurations, i.e. the flow plug 64 and orifice 66 size combinations may be adjusted for specific fluid weights/densities and flow rates to ensure appropriate pressure pulse amplitudes.

While the actuator 40 is described herein as a linear actuator, it should be noted that in some embodiments, the actuator 40 may use other methods such as, for instance rotation to move the pilot valve member 44 between the open and closed position.

Although the downhole valve 10 described herein produces positive pressure pulses by blocking the flow of the drilling fluid, it should be noted that the downhole valve 10 can be designed and configured in other ways. For instance, in another embodiment (not shown) the downhole valve 10 may produce a negative pulse by opening up a passage (not shown) which allows temporary communication between the drilling fluid inside the first tubular member 6 and/or the second tubular member 8 and drilling fluid returning to the surface. In some embodiments, the downhole valve 10 can produce both positive and negative pulses by relying on both types of operations, i.e., constricting a passage for the flow of fluid as well as opening up a passage for the flow of fluid.

The tool section 24 of the downhole valve 10 has been shown and described herein as a signal valve section, which, together with the pilot valve section 22 forms a mud pulse telemetry valve wherein linear actuation of the pilot valve member 44 creates a differential pressure in the second tube 30 which is communicated through the first tube 28 and causes the piston 62 to move between an open and a closed position. However, it should be understood that in other embodiments, the tool section 24 may be provided with a different tool (not shown) such as, for instance, a reamer, a vertical steerable tool, a rotary steerable tool, a bypass valve, a packer, a whipstock, or a stabilizer, that may be actuated or controlled by creating the pressure differential as described herein. In other words, the inventive concepts disclosed herein are adapted to communicate a pressure differential or pressure pulse across the slip joint 26 to engage different tools that may be operated by pressure differential or pressure pulse. In such embodiments, the pilot valve section 22 would operate in accordance with the concepts disclosed herein to create the pressure differential or pressure pulse which would be communicated from the second tube 30 through the first tube 28 which would be associated with the different tool.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. A method for assembling a downhole valve, comprising:
   connecting a first tubular member having a first bore and a first end to a second end of a second tubular member having a second bore thereby fluidly connecting, via a slip joint, a pilot valve section of the downhole valve secured within the first tubular member to a tool section of the downhole valve secured within the second tubular member, the slip joint being disposed within one of the first tubular member and the second tubular member and configured to form a connection allowing for rotational and longitudinal movement between the pilot valve section and the tool section, the pilot valve section provided with a pilot valve having a pilot valve member configured to be connected to an actuator to selectively move the pilot valve member into a closed or open position for providing a differential pressure or fluid flow through the slip joint, wherein a tool of the tool section is operable by the differential pressure or fluid flow from the pilot valve section through the slip joint;
   wherein the downhole valve is a mud pulse telemetry valve, and the tool section is a signal valve section of the mud pulse telemetry valve.

2. The method of claim 1, wherein the first end and the second end are threaded, and wherein connecting the first end to the second end is defined further as rotating one of the first tubular member and the second tubular member relative to the other one of the first tubular member and the second tubular member to threadably couple the first and second ends and simultaneously rotating at least a portion of the slip joint.

3. An assembly, comprising:
   a first tubular member having a first bore and a first end;
   a second tubular member having a second bore and a second end, the first end of the first tubular member connected to the second end of the second tubular member to form a tool joint; and
   a downhole valve disposed within the first bore and the second bore so as to span the tool joint, the downhole valve having a pilot valve section secured to the first tubular member and a tool section secured to the second tubular member, the pilot valve section and the tool section fluidly communicating through a slip joint formed when the first tubular member is coupled to the second tubular member, the slip joint configured to form a connection allowing for rotational and longitudinal movement between the pilot valve section and the tool section, the pilot valve section including a pilot valve having a pilot valve member configured to be connected to an actuator to selectively move the pilot valve member into a closed or open position;
   wherein the downhole valve is a mud pulse telemetry valve, and the tool section is a signal valve section of the mud pulse telemetry valve.

4. The assembly of claim 3, wherein the pilot valve section includes a first tube, and the tool section includes a second tube coupled to the first tube, at least one of the first and second tube extending across the tool joint and forming the slip joint.

5. The assembly of claim 4, wherein the first tube and the second tube are slidably coupled.

6. A downhole valve, comprising:
a pilot valve section having a first tube in fluid communication with a pilot valve, the pilot valve provided with a pilot valve member configured to be connected to an actuator to selectively move the pilot valve member into a closed or open position for providing a differential pressure or fluid flow through the first tube;
a tool section having a tool and a second tube, the second tube slidably coupled to the first tube of the pilot valve section to form a slip joint separate from the tool so as to provide fluid communication between the pilot valve section and the tool section, the tool operable by differential pressure or fluid flow ported through the first and second tubes;
wherein the pilot valve section is secured within a first bore of a first tubular member and the tool section is secured within a second bore of a second tubular member, wherein the slip joint is formed by coupling the first tubular member to the second tubular member, the slip joint being disposed within one of the first tubular member and the second tubular member and configured to form a connection allowing for rotational and longitudinal movement between the pilot valve section and the tool section;
wherein the downhole valve is a mud pulse telemetry valve, and the tool section is a signal valve section of the mud pulse telemetry valve.

* * * * *